(No Model.)
J. APSEY.
Locomotive Truck.
No. 238,324. Patented March 1, 1881.
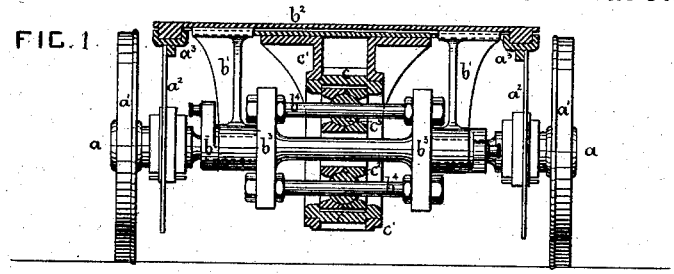
FIG. 1.
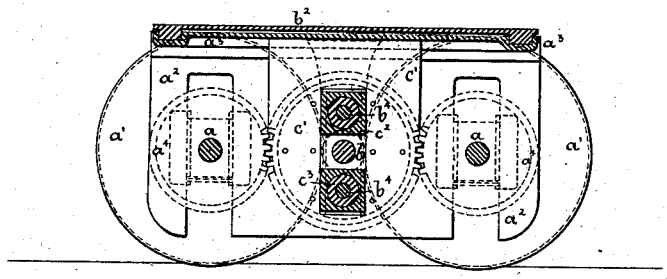
FIG. 2.
FIG. 3
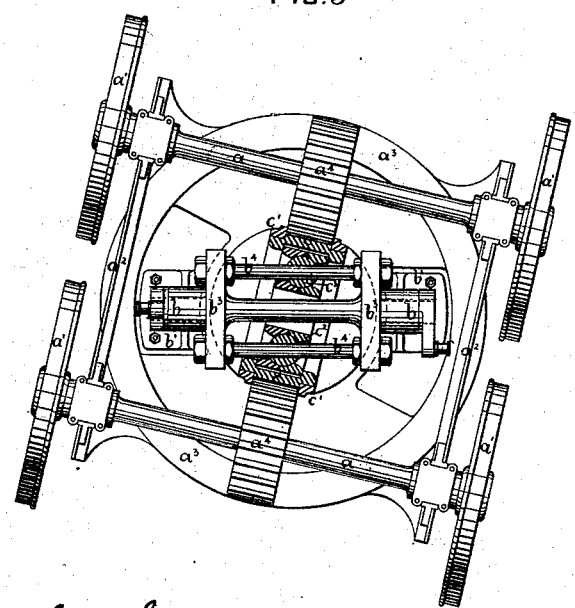
Witnesses.
J. A. Rutherford
Robert Everett
Inventor.
Joseph Apsey.
by James L. Norris.
Atty.

UNITED STATES PATENT OFFICE.

JOSEPH APSEY, OF WATERLOO BRIDGE ROAD, COUNTY OF SURREY, ENGLAND.

LOCOMOTIVE-TRUCK.

SPECIFICATION forming part of Letters Patent No. 238,324, dated March 1, 1881.

Application filed January 13, 1881. (No model.) Patented in England June 1, 1880.

*To all whom it may concern:*

Be it known that I, JOSEPH APSEY, of Waterloo Bridge Road, in the county of Surrey, England, have invented a new and useful Improved Apparatus for Driving Bogie-Axles of Locomotive Vehicles, (for which I have obtained a Patent in Great Britain, No. 2,240, bearing date June 1, 1880,) of which the following is a specification.

In locomotive vehicles such as are employed on common roads, tramways, or railways having rapid curves, some of the axles have to be mounted on bogie-frames, so that they may be free to accommodate themselves to curves by taking attitudes of various degrees of obliquity to the axis of the vehicle. In many cases it is desirable that such bogie-axles should operate as driving-axles for the propulsion of the vehicle; but it is generally inconvenient to mount the engine on a bogie-frame.

My invention relates to means of communicating rotary motion to bogie-axles of a vehicle from a shaft mounted in stationary bearings on the vehicle, so that while the bogie-axles are free to take oblique attitudes relatively to the shaft by which they are driven, that shaft and the engine which works it retain their stationary position relatively to the vehicle. I will describe apparatus which I employ for this purpose, referring to the accompanying drawings, representing its application for driving the axles of a four-wheeled bogie from a shaft which may be worked either directly or through intermediate gearing from a steam-engine or other motor fixed on the body of the vehicle.

Figures 1 and 2 are, respectively, transverse and longitudinal sections, partly in elevation, and Fig. 3 is a plan, partly sectional, of so much of the apparatus as is necessary to explain its construction and operation.

$a\ a$ are the two axles of the bogie, having on them the driving-wheels $a'$. The axles $a\ a$ work in bearings in the horn-plates $a^2$, extending down from the frame $a^3$, which can turn as on a vertical axis on the under face of the fixed plate $b^2$. From the plate $b^2$ two brackets, $b'$, project downward through slots in the turning frame $a^3$, and these brackets form bearings for the driving-shaft $b$. The slots in the frame $a^3$ being limited in extent, the brackets $b'$ projecting through them operate as stops to prevent the bogie-frame from turning horizontally beyond a certain angular distance in either direction.

On the shaft $b$ are fixed crank-arms $b^3$, connected together by round pins $b^4$, which pass through the driving-wheel $c$. This wheel, which gears with wheels $a^4$, fixed on the axles $a$, is fitted to revolve between two side cheeks, $c'$, that project down from the middle of the turning frame $a^3$, so that as the bogie, with its axis and wheels, moves angularly, in either direction, round its vertical axis, the wheel $c$ moves with it to an attitude more or less inclined to the axis of the shaft $b$.

In the wheel $c$ there is a rectangular slot, in which are fitted two blocks, $c^2$, which can slide radially toward or away from the center of $c$. In each of the blocks $c^2$ is fitted a ball, $c^3$, through the center of which passes the crank-pin $b^4$. The balls $c^3$ being free to slide along the pins $b^4$, and also to turn within the blocks $c^2$, which are free to slide radially, the whole forms a universal joint connecting the shaft $b$ to the wheel $c$, so that the rotation of the former is communicated to the latter, and from it, by the gearing-wheels $a^4$, to the axles $a$ and their wheels $a'$, while at the same time the wheel $c$, along with the bogie-frame, can take attitudes more or less inclined to the shaft $b$. The arrangement might obviously be inverted—that is to say, either of the axles $a$ might be taken to be a driving-shaft, and $b$ might be a bogie-axle driven from it.

Instead of two crank-pins, $b^4$, a greater number might be employed, so as to subdivide the work and proportionally reduce the strain passing through each of the joints. A single crank-pin would suffice; but it is preferable to have two, as shown, for the better equalizing and distributing of the strain. Instead of employing toothed gear for communicating motion from the wheel $c$ to the axles $a$, other known connections, such as bands, driving-pulleys, or chain driving-wheels might be employed.

Without limiting myself to any particular materials, dimensions, or proportions adopted in constructing apparatus such as I have described,

I claim as my invention—

1. The combination, in an apparatus for driving bogie-axles, of a permanent axle having one or more crank pins or rods suitably supported parallel therewith, and a toothed wheel provided with a radially-sliding block or blocks in each of which is arranged a ball fitted to turn therein, and provided with a bearing through which one of the crank-pins passes, substantially as described, whereby the said toothed wheel is permitted to assume any angle to correspond with the position of another toothed wheel or wheels with which it may be geared.

2. In apparatus for driving bogie-axles, the combination of the shaft $b$, crank-arms $b^3$, pins $b^4$, wheel $c$, blocks $c^2$, and balls $c^3$, arranged and operating substantially as herein described.

In testimony whereof I have signed my name to this specification in the presence of two subscribing witnesses this 15th day of December, A D. 1880.

JOSEPH APSEY.

Witnesses:
CHAS. BERKLEY HARRIS,
17 *Gracechurch Street, London.*
W. J. NORWOOD,
*Clerk to Messrs. Scorer & Harris, Notaries,*
17 *Gracechurch Street, London.*